United States Patent [19]

Willson et al.

[11] Patent Number: 4,972,077
[45] Date of Patent: Nov. 20, 1990

[54] WAVELENGTH MULTIPLEXED OPTICAL TRANSDUCER WITH A SWEPT WAVELENGTH OPTICAL SOURCE

[75] Inventors: Jolyon P. Willson, Duxford; Darran Kreit, Welwyn, both of England

[73] Assignee: Schlumberger Industries Limited, Hampshire, England

[21] Appl. No.: 384,630

[22] Filed: Jul. 25, 1989

[30] Foreign Application Priority Data

Aug. 8, 1988 [GB] United Kingdom ............... 8818767
Nov. 16, 1988 [GB] United Kingdom ............... 8826746
Jun. 21, 1989 [GB] United Kingdom ............... 8914269

[51] Int. Cl.$^5$ .......................... H01J 5/16; G01B 9/02
[52] U.S. Cl. ........................ 250/227.27; 250/231.10; 250/205; 356/345; 356/352
[58] Field of Search ............... 250/227.27, 227.19, 250/231.10, 205; 356/345, 346, 349, 352

[56] References Cited

U.S. PATENT DOCUMENTS

| | | | |
|---|---|---|---|
| 4,653,855 | 3/1987 | Birnbach et al. | 356/345 |
| 4,755,668 | 7/1988 | Davis | 356/345 |
| 4,799,797 | 1/1989 | Huggins | 356/345 |
| 4,818,064 | 4/1989 | Youngquist et al. | 250/227.27 |
| 4,848,906 | 7/1989 | Layton | 356/345 |
| 4,861,136 | 8/1989 | Stone et al. | 356/352 |
| 4,868,381 | 9/1989 | Davis | 250/227.27 |
| 4,873,989 | 10/1989 | Einzig | 356/345 |

Primary Examiner—Edward P. Westin
Attorney, Agent, or Firm—Sanford J. Asman

[57] ABSTRACT

An optical transducer system for use with an optical transducer of the kind which produces a wavelength multiplexed optical output signal comprises a broadband optical source, and a tunable filter in the form of a Fabry-Perot interferometer connected to receive a broadband optical signal from the source. The interferometer is repeatedly swept through its pass band by a control signal of triangular or sawtooth waveform, producing a swept wavelength optical output signal for application to the transducer. In one embodiment, the optical output signal from the transducer is compared with the output signal from the interferometer to decode it, while in another embodiment, a control loop maintains the output amplitude (intensity) of the broadband source substantially constant over the range of wavelengths used by the transducer, enabling a reference channel provided in the transducer to be used for decoding purposes.

16 Claims, 6 Drawing Sheets

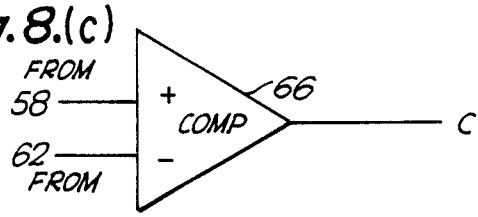
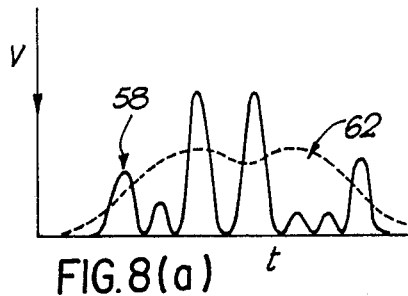
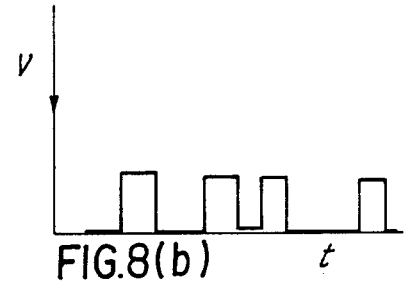
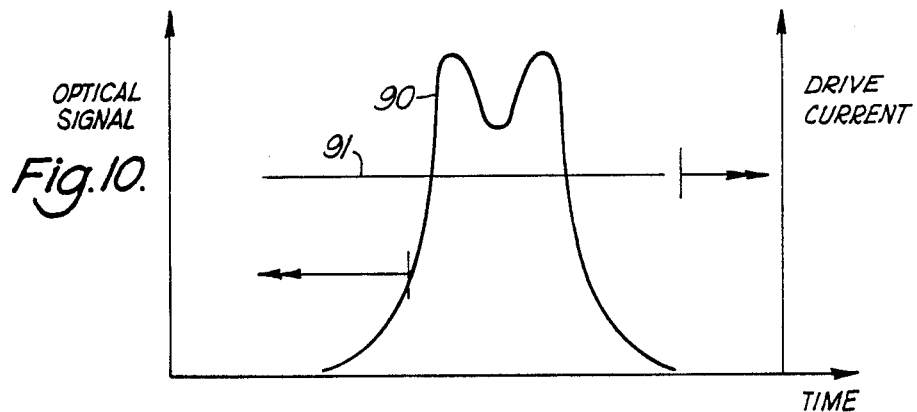
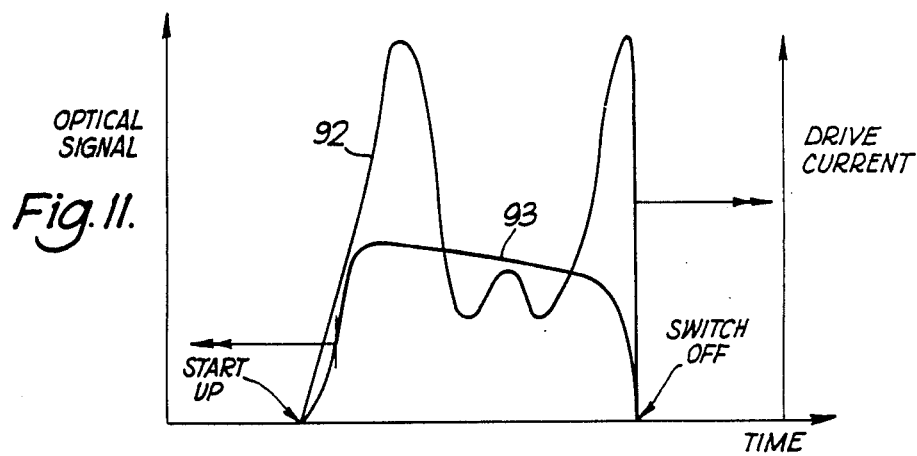

WAVELENGTH MULTIPLEXED OPTICAL TRANSDUCER WITH A SWEPT WAVELENGTH OPTICAL SOURCE

BACKGROUND OF THE INVENTION

The present invention relates to optical transducer systems, and is more particularly concerned with optical transducer systems of the kind involving an optical transducer which produces a wavelength multiplexed output signal, such as the transducer described in our United Kingdom Patent Application No. 8720156 (Publication No. 2 209 101A).

A wavelength multiplexed optical position transducer is described in our aforementioned United Kingdom patent application No. This transducer uses a graded-index rod lens and a glass wedge grating assembly to disperse and recombine a broad spectrum optical signal generated by an LED. The dispersed light is reflected by a coded strip and the combination of wavelengths present in the recombined spectrum is a function of the position of the lens/grating assembly relative to the coded strip.

The recombined signal from a transducer is transmitted along a single optical fibre to a detector system. The detector system wavelength demultiplexes the received signal in a further wedge/grating assembly.

Typically a ten bit coded strip is used in the transducer to reflect the various wavelengths in the dispersed optical signal. A further channel is sued to provide a continuous ON signal for use as a reference channel. This reference channel is used to compensate for wavelength-independent variable system losses such as poor optical connections, bent fibres, and ageing of the LED's. However, there may be further, wavelength-dependent, variations in intensity caused by factors such as temperature variations of the LEDs. The LEDs could have their temperatures stabilized by using PELTIER coolers but this is not a practical solution in many applications due to the low lifetime of Peltier coolers at elevated temperatures (eg 10,000 hours at 125° C.).

Another drawback with the prior detector system is the fact that eleven data channels have to be dealt with simultaneously. This means that each channel requires a separate photodiode, pre-amplifier and phase-sensitive detector, which makes it difficult to reduce the size and weight of the detector system for applications such as aerospace, where these are important factors.

It is an object of the present invention to alleviate at least some of the drawbacks of the prior optical transducer and its detector system.

SUMMARY OF THE INVENTION

According to one aspect of the present invention, there is provided an optical transducer system comprising a broadband optical signal source, an interferometer coupled to receive a broadband optical signal from the source, means for varying the wavelength of the optical signal transmitted by the interferometer, an optical transducer coupled to receive the varying wavelength optical signal transmitted by the interferometer and responsive thereto to produce a wavelength multiplexed optical output signal representative of a parameter being monitored by the transducer, and detector means coupled to receive and monitor the optical output signal from the transducer.

In a preferred embodiment of the invention, the detector means is coupled to receive and compare the optical output signal from the transducer and the varying wavelength optical signal from the interferometer.

Preferably, the varying wavelength optical signal from the interferometer is used to provide a threshold level with which the output signal from the transducer is compared, whereby to compensate automatically for any wavelength drift in the source and any changes in the overall transmission characteristics in the interferometer.

According to another aspect of the present invention, there is provided a variable wavelength optical source for a wavelength multiplexed optical transducer, the source comprising a broadband optical source, an interferometer coupled to receive a broadband optical signal from the source, and means for periodically varying the wavelength passed by the interferometer so as to produce a swept wavelength optical output signal for application to the transducer.

In both of the aspects of the invention mentioned hereinbefore, the interferometer is preferably a Fabry-Perot interferometer, and the broadband source preferably comprises at least two light emitting diodes with different but partially overlapping output spectra.

Furthermore, and again in both of the aspects of the invention mentioned hereinbefore, there is preferably provided control means for maintaining the amplitude of the optical signal transmitted by the interferometer substantially constant, which control means preferably comprises a photo-sensitive detector coupled to receive the optical signal transmitted by the interferometer, a differential amplifier coupled to receive the output of the photo-sensitive detector and a reference level so as to produce a control signal dependent upon the difference therebetween, a variable current source for supplying drive current to the light-emitting diodes, and a control circuit coupled to the variable current source and responsive to the control signal to vary the drive current to the light emitting diodes so as to tend to reduce said difference.

According to yet another aspect of the present invention, there is provided apparatus to decode a wavelength multiplexed optical signal, comprising an interferometer receiving the wavelength multiplexed optical signal and also receiving a source optical signal from which the wavelength multiplexed optical signal is generated, both the optical signals being filtered by the interferometer in parallel, means for varying the wavelength passed by the interferometer, and means for monitoring the two optical signals transmitted by the interferometer.

BRIEF DESCRIPTION OF THE DRAWINGS

The invention will now be described in more detail, by way of example only, with reference to the accompanying drawings, of which:

FIG 8(c) shows a comparator to generate an output when the signal spectrum is greater than the source spectrum and FIGS. 8(a) and 8(b) show the comparison graphically;

FIGS. 10 to 12 are explanatory diagrams useful for explaining the operation of the system of FIG. 9.

DETAILED DESCRIPTION

Figure 1:
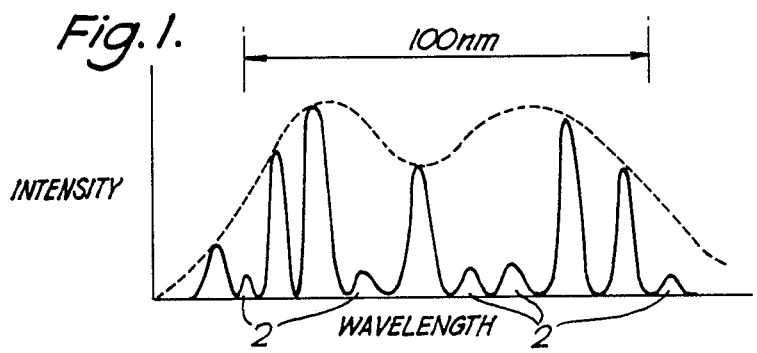
FIG. 1 shows a typical modulated LED spectrum after transmission through an optical fibre leading from an optical transducer.

The spectrum shown in FIG. 1 is the type that would be received from an optical position transducer which uses a coded reflective strip to reflect different wavelengths of a dispersed spectrum according to the position of the coded strip. The bandwidth of the spectrum illustrated is 100nm. Each channel is received as a '1' or a '0'. The non-zero levels 2 of the '0'state are present after transmission through an optical fiber and are caused by back reflections in the fiber. The envelope of the spectrum is indicated by the dotted line. The ratio of the on/off states is typically in the range of 4–6dB.

Figure 2:
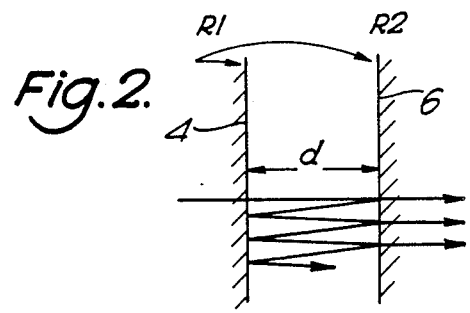
FIG. 2 shows a schematic cross-section through a Fabry-Perot interferometer.

A Fabry-Perot interferometer (FP) may be used to decode such a spectrum and a schematic cross-section through an FP is shown in FIG. 2. This shows the passage of light through the FP for a given separation d of the two parallel, partially transmitting mirrors 4 and 6 which have reflectivities R1 and R2 respectively.

Figure 3:
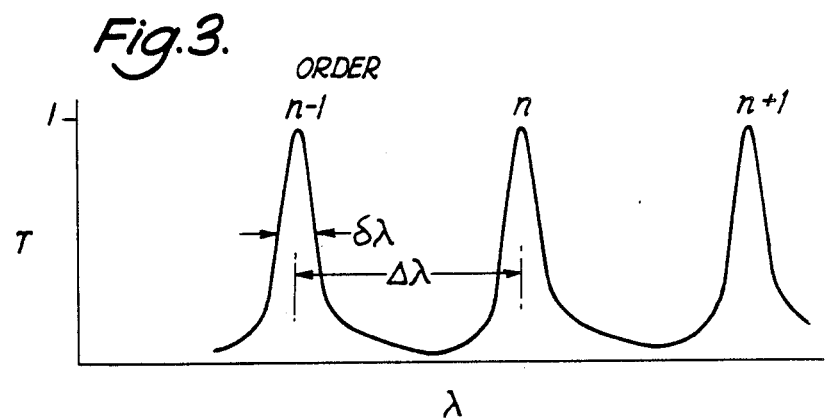
FIG. 3 shows the spectral transmission characteristics of the Fabry-Perot interferometer.

FIG. 3 shows the spectral transmission characteristics of an FP. This consists of a series of peaks (or orders) of width $\delta\lambda$, separated by the free spectral range (fsr), $\Delta\lambda$. The ratio $\Delta\lambda/\delta\lambda$ is called the finesse and for a high-quality FP this is in the range 40–100. For an ideal FP the peak transmission would be 100%, but in practice this will be in the range 50–70%.

The wavelength position of the transmitted peaks is dependent upon the spacing d of the mirrors of the FP. Changing d by $\lambda/2$ will move the order n peak to the position of the order n+1 (or n-1) peak. Therefore, if the fsr is in the range 150–200nm, the transmission peak of order n can be scanned across the full LED spectrum of FIG. 1. If the fsr is 200 nm and the finesse is 50 then the peak width will be 4 nm. This then enables the peak to be scanned through and to resolve the spectrum of FIG. 1 by varying the gap between the mirrors.

Figure 4:
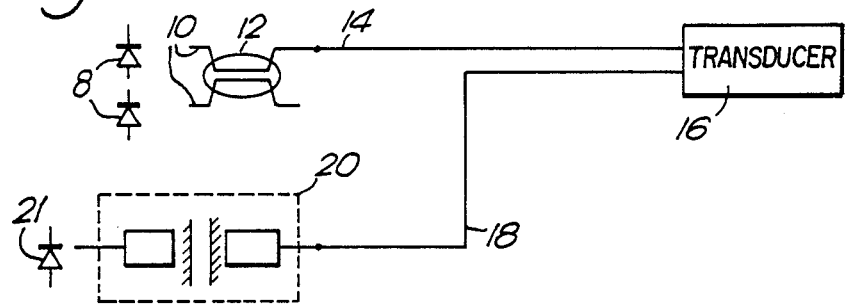
FIG. 4 shows an optical transducer system using a Fabry-Perot interferometer to demultiplex a wavelength multiplexed signal.

An optical transducer system which uses an FP in the detector is shown in FIG. 4. Two source LEDs 8 direct broad band light down two optical fibers 10. The fibers are connected to a fiber optic coupler 12 which transmits light from the two LEDs down a single optical fiber 14 connected to one of its outputs. This fiber 14 is connected to the input of an optical position transducer 16. No details of this transducer are given: it may be as described in the aforementioned application. The output of the transducer 16 is connected to a further optical fiber 18, which is in turn connected to the input of an FP 20. The output of the FP 20 illuminates a photo-sensitive detector 21 which provides an output signal proportional to intensity. Changing the gap width of the FP enables the whole spectrum output by the transducer 16 to be scanned through to detect the peaks representing each '1', so that the position can be determined from the output of the photo-sensitive detector.

Figure 5:
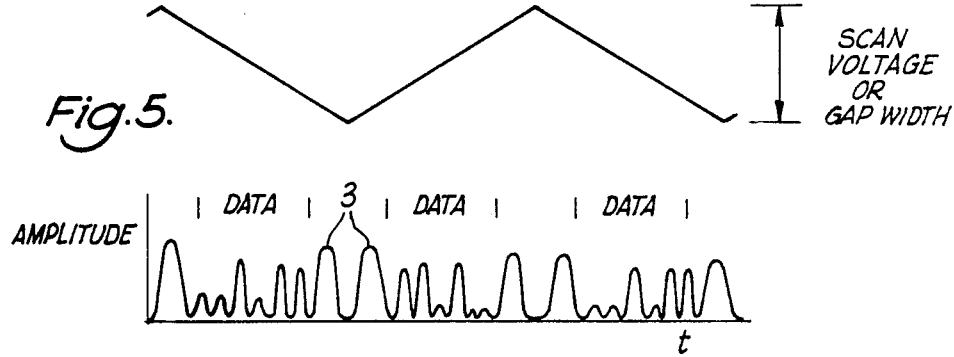
FIG. 5 shows the scan voltage applied to the Fabry-Perot interferometer and a typical output spectrum obtained from the system of FIG. 4.

Piezo-electric crystals may be used to alter the positions of the mirrors in an FP (such as in the WD1 FP wavelength demultiplexer produced by Queensgate Instruments Ltd), and the shape of the voltage waveform applied to them will correspond to the variation in d with time, as shown in FIG. 5. This is a simple triangular waveform. The resultant output of the FP as picked up by the photo-sensitive detector 21 is shown beneath the triangular waveform. Thus the intensities representing data values of '1' or '0' are detected by the photo-sensitive detector 21. For simplicity, a six bit code is shown in FIG. 5, and it can be seen that the output on the negative-going slope of the triangular waveform is the mirror image of that on the positive-going slope. Large humps 3 may be produced between the groups of data channels due to imperfect mirror coatings, but these do not have any serious effect on the data output.

Figure 6:
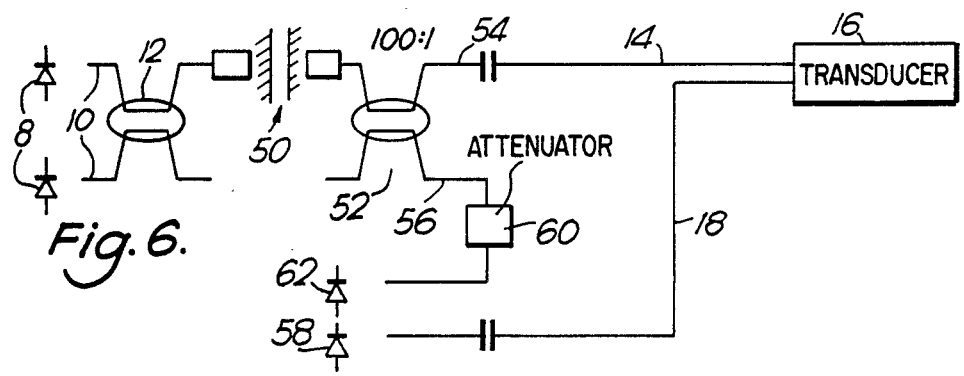
FIG. 6 shows an optical transducer system which embodies the invention.

In order to overcome the drawbacks of the simple system of FIG. 4, and at the same time to provide a reference signal from the source for comparison with the signal from the transducer 16 while minimizing the number of optical couplers required, the optical transducer system of the present invention, as shown in FIG. 6, is provided. This system comprises the two source LEDs 8 connected via the optical fibers 10 to the coupler 12, but the output of the coupler 12 transmits light from the two LEDs to the input of an FP 50 (instead of to the input of the transducer 16). The FP 50 is driven by (ie has the gap d between its mirrors varied by) the triangular waveform of FIG. 5, and its output is connected to an input port of a second coupler 52. The coupler 52 has two output ports 54, 56 between which light at the input of the coupler is preferably divided in the ratio 100:1 (although the use of lower ratios is feasible).

The portion of the light leaving the coupler 52 via its output port 54 is directed via the optical fibre 14 to the transducer 16, whose output is connected via the optical fibre 18 to a first photo-sensitive detector 58, while the portion of the light leaving the other output port 56 of the coupler 52 is directed via a variable attenuator 60 to a second photo-sensitive detector 62.

The combination of the LEDs 8 and the FP 50 operates as a tunable broadband source, so that the light arriving at the transducer 16 has its wavelength periodically swept first in one direction and then in the other. The output of the transducer 16 is therefore time multiplexed as well as wavelength multiplexed.

Figure 7A:
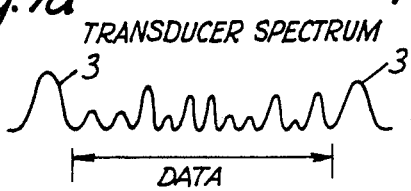
FIGS. 7(a) and 7(b) show the transducer and source spectra for the system of FIG. 6.
Figure 7B:
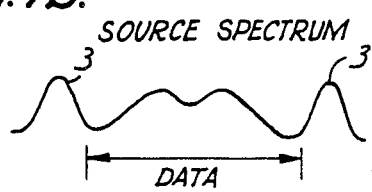

The photo-sensitive detectors 58 and 62 simultaneously monitor the time-varying output spectrum from the transducer 16 and the simultaneously time-varying spectrum from the FP 50 (ie the input spectrum to the transducer 16). These two spectra are illustrated in FIG. 7, the transducer spectrum (a) being formed from large and small peaks representing '1' or '0' values respectively, and the source spectrum (b) being a continuous broadband signal. Since both spectra take the same optical path through the RP 50, they both see the same optical characteristics in terms of mirror spacing, mirror reflectivities etc. This is in practice very important since the mirrors may not be perfectly flat and parallel.

The spectrum received by detector 62 is used as a threshold level for the transducer signal, as shown in FIG. 8(c). The outputs from the two detectors 58, 62 are connected to the inputs of a comparator 66. When the level of the transducer spectrum exceeds the level of the source spectrum, which is set to a suitable amplitude by the attenuator 60 as shown in the graph of FIG. 8(a), the output C of the comparator 66 goes high as shown in the graph of FIG. 8(b). Using this type of detection, any wavelength drift of the source LEDs is automatically compensated for, since source and transducer spectra will both drift by the same amount and in the same direction.

As is apparent from FIGS. 1 and 8, the signal-to-noise ratio for the channels at the two extremes of the spectrum is significantly worse than for those in the central region of the spectrum. This problem can be substantially alleviated by the improved system of FIG. 9, which comprises many of the elements of the system of FIG. 6, together with a control circuit for maintaining the amplitude (or intensity) of the optical signal at the output of the FP 50 substantially constant for all eleven channels.

Figure 9:
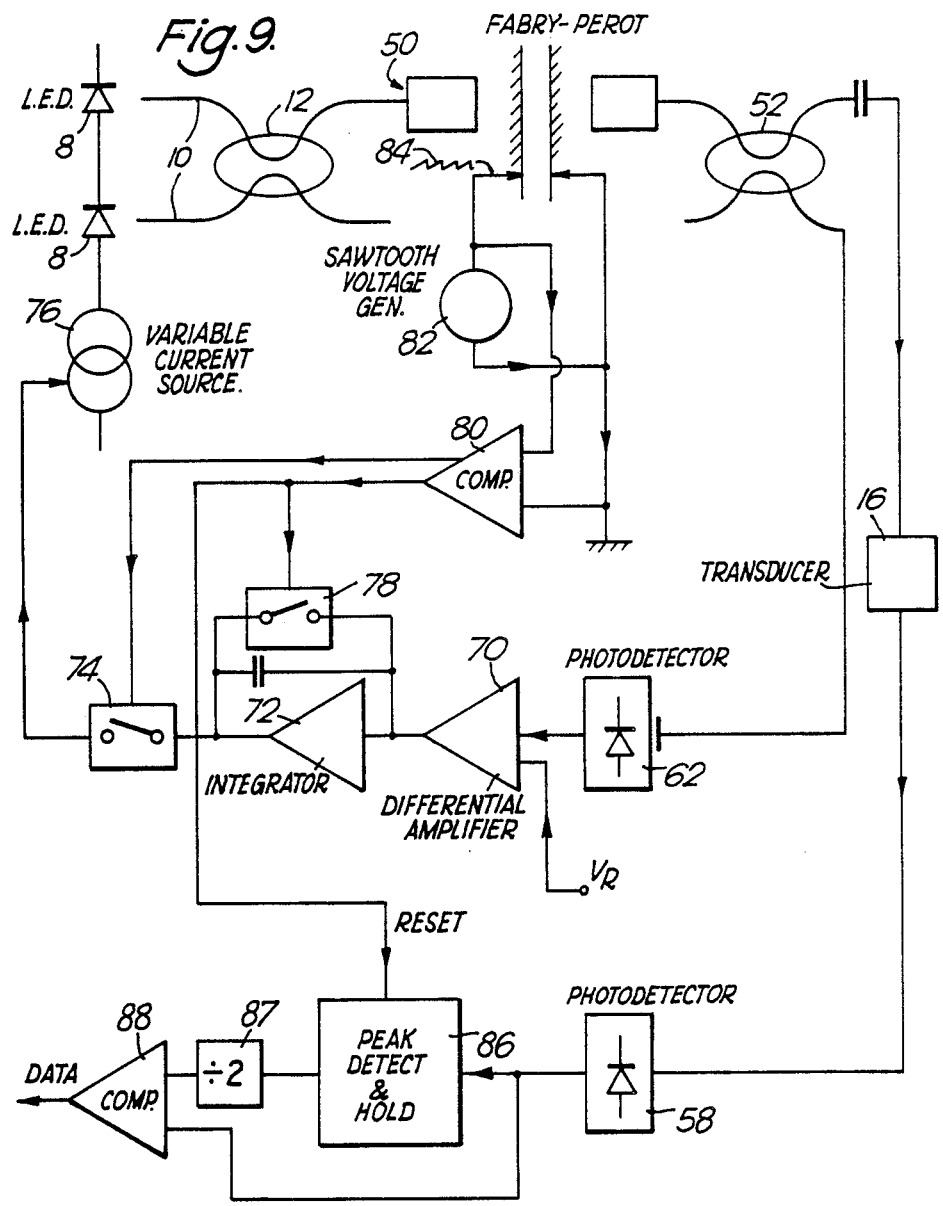
FIG. 9 shows another optical transducer system in accordance with the invention.

Thus the system of FIg. 9 still comprises the two source LEDs 8 connected via the optical fibres 10, the coupler 12, the FP 50 and the coupler 52 to the transducer 16 on the one hand and to the photo-sensitive detector 62 on the other hand, but the output of the photo-sensitive detector 62 is connected to one input of a differential amplifier 70 whose other input is connected to receive a reference voltage $V_R$. The output of the differential amplifier 70 is connected to the input of an integrator 72, whose output is connected via a switch 74 to the control input of a variable current source 76 which provides the drive current to the two source LEDs 8. The integrator 72 is provided with a reset switch 78, the switches 74 and 78 being controlled by a comparator 80 connected to receive a sawtooth voltage waveform, which is also applied to the FP 50 in place of the triangular waveform mentioned earlier: this sawtooth waveform is produced by a suitable sawtooth waveform generator 82, and is illustrated at 84 in FIG. 9.

Figure 12:
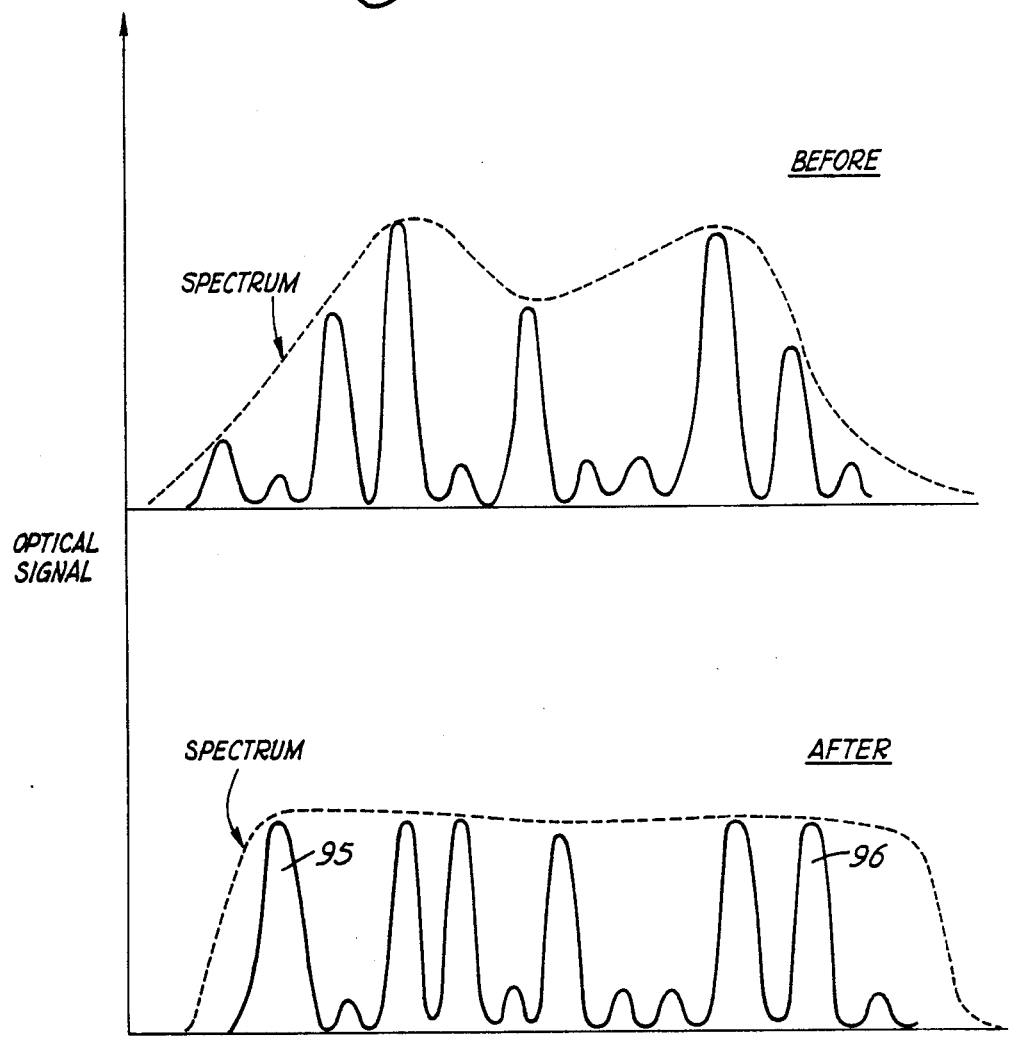

In operation, the comparator 80 momentarily closes the reset switch 78, and then closes the switch 74, just after the beginning of an up-going ramp of the sawtooth voltage waveform produced by the generator 82. The output of the integrator 72 immediately begins to ramp up, causing a rapid rise in the current supplied by the current source 76 to the LEDs 8. However, as the transmission frequency of the FP 50 approaches the centre frequency of the first of the source LEDs 8, the output of the photo-sensitive detector 62 increases sufficiently for the output of the differential amplifier 70 to change polarity. This causes the output of the integrator 72 to ramp back down, so reducing the drive current to the LEDs 8. Thus the drive current to the LEDs 8 tends to follow a curve which is the inverse of the spectrum they would produce with constant drive current, with the result that the amplitude (or intensity) of the optical signal at the output of the FP 50 tends to be uniform over the useful part of its frequency range. This can best be seen in FIGS. 10 and 11, in which FIG. 10 shows at 90 the variation with time of the amplitude of the optical output signal from the FP 50 at constant drive current (shown at 91) to the source LEDs 8, over half a cycle of operation of the FP 50, while FIG. 11 shows at 92 the varying drive current to the LEDs 8 produced by the circuit of FIg. 9, and at 93 the resulting variation with time of the amplitude of the optical output signal from the FP 50, again over half a cycle of operation of the FP 50. Similarly, FIG. 12 illustrates the improvement between the amplitudes of the bits of the various channels for the FP 50 output signal of FIG. 10, shown in the upper half of FIG. 12, and the amplitudes of FIG. 11, shown in the lower half of FIg. 12: the improved signal-to-noise ratio of the channels 95, 96 at the two extremes of the spectrum is readily apparent in the lower half of FIg. 12.

Just before the end of the up-going ramp of the sawtooth voltage waveform produced by the generator 82, the comparator 80 opens the switch 74, momentarily closes the reset switch 78 to reset the integrator 72, and then closes the switch 74 again just after the sawtooth voltage waveform starts its next up-going ramp, and a sequence of events identical to those of the preceding paragraph is repeated.

The comparator 80 and the switch 74 together ensure that the current source 76 is not caused to supply excessively high drive current to the two source LEDs 8.

The output of the photo-sensitive detector 58 can be connected to the comparator 66, as in the embodiment of FIGS. 6 and 8, or to a comparator having its other input connected to receive a reference voltage which is a predetermined proportion, eg 50%, of the reference voltage $V_R$: alternatively and preferably, it is connected to the input of a peak detecting sample-and-hold circuit, shown at 86 in FIG. 9. The circuit 86 has a reset input which is connected to receive a reset signal from the comparator 80 simultaneously with the operation of the reset switch 78, and its output is connected via a divide-by-two voltage divider 87 to one input of a comparator 88. The other input of the comparator 88 is connected to the output of the photosensitive detector 62. With this arrangement, the peak amplitude of the signal produced by the photodetector 58 for the first channel, which is chosen to be the continuously ON reference channel mentioned earlier, is stored in the circuit 86 near the beginning of each cycle of the sawtooth waveform produced by the generator 82, and half this amplitude, produced by the voltage divider 87, is used by the comparator 88 as the reference threshold for detecting the bit values of the remaining ten data channels.

Figure 13:
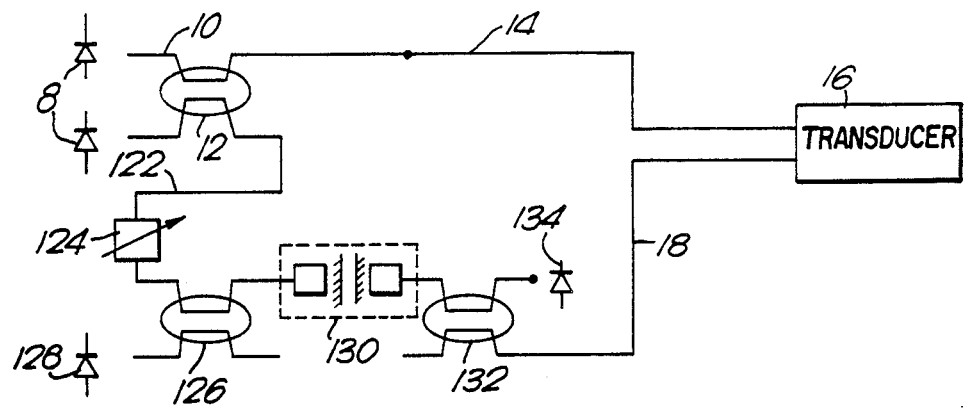
FIGs. 13 and 14 show further embodiments of optical transducer systems in accordance with the invention.

Another embodiment of the invention is shown in FIG. 13. This embodiment again comprises the two source LED's 8, connected via the optical fibres 10 to coupler 12: however, the coupler 12 transmits a first portion of the light to an output connected directly to optical fibre 14, which is again connected to the input of the transducer 16. A second portion of the light is transmitted to a second output of the coupler 12, which second output is connected to an optical fibre 122 which transmits light via an attenuator 124 to a port on a first side of a further coupler 126. The other port on the first side of the coupler 126 is connected to a photo-sensitive detector 128. One port on the opposing side of the coupler 126 is connected to a first side of an FP 130.

The outputs of the transducer 16 is again connected to the optical fibre 18, which this time transmits light to a port on a first side of a coupler 132. The other port on the first side of coupler 132 is connected to a second photo-sensitive detector 134. One port on the opposing side of the coupler 132 is connected to the second side of the FP 130.

The coupling ratio of coupler 126 is preferably of the order of 100:1, but the system has been demonstrated to work with a coupling ratio of the order of 15:1. Coupler 132 preferably has a coupling ratio of the order of 3:1.

The reason for the difference in coupling ratios is to reduce the back reflection from the connection to the FP 30. This connection is made with an expanded beam connector. This back reflection which reaches detector 128 has to be minimised without significantly reducing the strength of the signal transmitted by the transducer 16 to detector 128. Thus, light passing from left to right through coupler 126 is attenuated by, for example, −14dB, whilst light passing from right to left is attenuated by −2dB. The difference in attenuation levels in the coupler 132 is much less than this and if a 1:1 coupling ratio is used the attenuation will be the same in both directions. Thus the back reflection from the source signal reaching detector 128 will have been attenuated much more than the signals from the transducer 16 reaching the detector 128.

With coupling ratios of 15:1 and 3:1 for couplers 126 and 132 respectively the total attenuations in the system can be approximated as follows. These assume attenuation levels of −1dB for each length of optical fiber, −20dB for the transducer, −5dB for the FP 130, −3dB for the attenuator 124, −14dB and −2dB for coupler 126 and −8dB and −3dB for coupler 132; the values for the couplers are for light travelling from left to right and right to left respectively.

|  | Attenuation |
|---|---|
| transducer signal | −34dB |
| source signal | −34dB |
| source back reflection | −37dB |

These levels have been demonstrated to be adequate but, if the coupling ratios of couplers 126 and 132 are altered to 100:1 and 1:1 respectively then the difference in attenuation between the transducer signal and the back reflected source signal increases to 7dB.

The output signal from the transducer 16 passes through the optical fiber 18, the coupler 132, the FP 130, the coupler 126 and is detected by photo-sensitive detector 128. A triangular waveform as shown in FIG. 5 is again used to alter the gap d between the mirrors of the FP 130. At the same time the source light is transmitted via attenuator 124, coupler 126, FP 130, and coupler 132 to photo-sensitive detector 134. Thus the photo-sensitive detectors 128 and 134 simultaneously monitor the spectrum from the transducer and the source spectrum. The two spectra are again as illustrated in FIg. 7, the transducer spectrum (a) being formed from large and small peaks representing '1' or '0' values respectively, and the source spectrum (b) being a continuous broad band signal. Since both spectra again take the same optical path through the FP, they both again see the same optical characteristics in terms of mirror spacing, mirror reflectivities etc. As already mentioned, this is in practice very important since the mirrors may not be perfectly flat and parallel.

The source spectrum received by detector 134 can be used as a threshold level for the transducer signal, as described hereinbefore with reference to FIg. 8. As already explained, using this type of detection, any wavelength drift of the source LED's is automatically compensated for since source and transducer spectra will both drift by the same amount and in the same direction.

Figure 14:
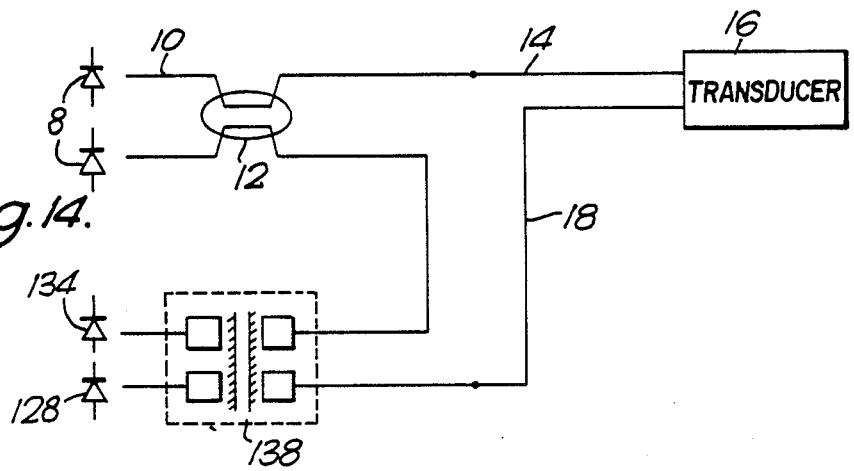

Yet another embodiment of the invention is shown in FIG. 14. This again comprises the two source LED's 8 connected to one side of the coupler 12. The coupler 12 transmits a first portion of the source light to transducer 16 and a second portion of the source light to a dual-ported FP filter 138. The output of the transducer 16 is connected to the same side of the FP 138. The two photo-sensitive detectors 128, 134 receive the spectra from the transducer and the source respectively. The signals from these two photo-sensitive detectors can be used in a similar manner to those of FIg. 13, ie the source spectra can be used as a threshold for the transducer spectra.

It can therefore be seen that in the embodiments of FIGS. 13 and 14, passing source and transducer signals through an RP in parallel gives an effective method of automatically compensating for wavelength drift of the source signal.

FP interferometers (or filters) may also scan through a range of wavelengths by altering the angle of the mirrors with respect to the direction of travel of the light. Such a filter has been described in a paper in Electronics Letters Vol. 24, No. 3, February 188 entitled "Inline tunable Etalon filter for optical channel selection in high density wavelength division multiplexed fibre systems" by A Frenkel and C Lin.

We claim:

1. An optical transducer system comprising a broadband optical signal source, an interferometer coupled to receive a broadband optical signal from the source, means for varying the wavelength of the optical signal transmitted by the interferometer, an optical transducer coupled to receive the varying wavelength optical signal transmitted by the interferometer and responsive thereto to produce a wavelength and time multiplexed optical output signal representative of a parameter being monitored by the transducer, and detector means coupled to receive and monitor the optical output signal from the transducer.

2. An optical transducer system as claimed in claim 1, wherein the detector means is coupled to receive and compare the optical output signal from the transducer and the varying wavelength optical signal from the interferometer.

3. An optical transducer system as claimed in claim 2, wherein the varying wavelength optical signal from the interferometer is used to provide a threshold level with which the output signal from the transducer is compared, whereby to compensate automatically for any wavelength drift in the source and any changes in the overall transmission characteristics in the interferometer.

4. An optical transducer system as claimed in claim 3, wherein the detector means comprises first and second photo-sensitive detectors respectively coupled to receive the optical signal from the transducer and the optical signal from the interferometer, and a comparator coupled to compare the respective outputs of the photo-sensitive detectors.

5. An optical transducer system as claimed in claim 1, wherein the interferometer is a Fabry-Perot interferometer.

6. An optical transducer system as claimed in claim 1, including control means for maintaining the amplitude of the optical signal transmitted by the interferometer substantially constant.

7. An optical transducer system as claimed in claim 6, wherein the broadband source is current-controlled, and the control means comprises a photo-sensitive detector coupled to receive the optical signal transmitted by the interferometer, a differential amplifier coupled to receive the output of the photo-sensitive detector and a reference level so as to produce a control signal dependent upon the difference therebetween, a variable current source for supplying drive current to the broadband source, and a control circuit coupled to the variable current source and responsive to the control signal to vary the drive current to the broadband source so as to tend to reduce said difference.

8. An optical transducer system as claimed in claim 7, wherein the control circuit comprises an integrator coupled to receive the control signal, and switches for applying the output of the integrator to the variable current source during a predetermined part of the wavelength range of the wavelength varying means and for resetting the integrator when the wavelength varying means reaches the end of said part of its range.

9. An optical transducer system as claimed in claim 6, wherein the optical output signal produced by the transducer includes a reference signal, and wherein the detector means includes a sample and hold circuit for periodically sampling and storing the magnitude of the reference signal and is arranged to compare the remainder of the optical output signal from the transducer with the stored reference signal.

10. An optical transducer system as claimed in claim 1, wherein the broadband source comprises at least two light emitting diodes with different but partially overlapping output spectra.

11. A wavelength multiplexed optical transducer with a variable wavelength optical source, the source comprising a broadband optical source, an interferometer coupled to receive a broadband optical signal from the source, and means for varying the wavelength of the optical signal transmitted by the interferometer so as to produce a swept wavelength optical output signal for application to the transducer.

12. A transducer as claimed in claim 11, wherein the interferometer is a Fabry-Perot interferometer.

13. A transducer as claimed in claim 11, including control means for maintaining the amplitude of the optical signal transmitted by the interferometer substantially constant.

14. A transducer as claimed in claim 13, wherein the broadband source is current-controlled, and the control means comprises a photo-sensitive detector coupled to receive the optical signal transmitted by the interferometer, a differential amplifier coupled to receive the output of the photo-sensitive detector and a reference level so as to produce a control signal dependent upon the difference therebetween, a variable current source for supplying drive current to the broadband source, and a control circuit coupled to the variable current source and responsive to the control signal to vary the drive current to the broadband source so as to tend to reduce said difference.

15. A transducer as claimed in claim 14, wherein the control circuit comprises an integrator coupled to receive the control signal, and switches for applying the output of the integrator to the variable current source during a predetermined part of the wavelength range of the wavelength varying means and for resetting the integrator when the wavelength varying means reaches the end of said part of its range.

16. A transducer as claimed in claim 11, wherein the broadband source comprises at least two light emitting diodes with different but partially overlapping output spectra.

* * * * *